US012632945B2

(12) United States Patent
Zhang et al.

(10) Patent No.: US 12,632,945 B2
(45) Date of Patent: May 19, 2026

(54) IMAGE PROCESSING METHOD AND APPARATUS, SYSTEM, AND STORAGE MEDIUM

(71) Applicant: Tencent Cloud Computing (Beijing) Co., Ltd., Beijing (CN)

(72) Inventors: Boshen Zhang, Beijing (CN); Yabiao Wang, Beijing (CN); Chengjie Wang, Beijing (CN); Jilin Li, Beijing (CN); Feiyue Huang, Beijing (CN)

(73) Assignee: Tencent Cloud Computing (Beijing) Co., Ltd., Beijing (CN)

( * ) Notice: Subject to any disclaimer, the term of this patent is extended or adjusted under 35 U.S.C. 154(b) by 453 days.

(21) Appl. No.: 18/130,165

(22) Filed: Apr. 3, 2023

(65) Prior Publication Data

US 2023/0237633 A1     Jul. 27, 2023

Related U.S. Application Data

(63) Continuation of application No. PCT/CN2021/108838, filed on Jul. 28, 2021.

(30) Foreign Application Priority Data

Mar. 16, 2021     (CN) .......................... 202110283503.4

(51) Int. Cl.
*G06T 7/00* (2017.01)
*G06V 10/22* (2022.01)
(Continued)

(52) U.S. Cl.
CPC ............ *G06T 7/0002* (2013.01); *G06V 10/22* (2022.01); *G06V 10/40* (2022.01); *G06V 10/764* (2022.01);
(Continued)

(58) Field of Classification Search
CPC ......... G06T 7/0002; G06T 2207/20021; G06T 2207/30168; G06T 2207/20084;
(Continued)

(56) References Cited

U.S. PATENT DOCUMENTS 10,346,969 B1 * 7/2019 Raghu ...................... G06N 3/08
12,060,082 B1 * 8/2024 Garimella ....... B60W 30/18159
(Continued)

FOREIGN PATENT DOCUMENTS

CN          106934803 A          7/2017
CN          109580656 A          4/2019
(Continued)

OTHER PUBLICATIONS

Communication issued Dec. 5, 2024 in Chinese Application No. 202110283503.4.

(Continued)

*Primary Examiner* — Xuemei G Chen
(74) *Attorney, Agent, or Firm* — Sughrue Mion, PLLC

(57)          ABSTRACT

An image processing method and apparatus that includes: performing feature extraction processing on N image regions of a to-be-processed image respectively to obtain feature data corresponding to the N image regions respectively, N being an integer greater than or equal to 1, performing defect detection on the N image regions respectively according to the feature data corresponding to the N image regions respectively to obtain a prediction probability of a defect in each of the N image regions, obtaining attention for each image region, adjusting the prediction probability of the defect in each image region according to the attention for each image region, and generating a prediction result of the to-be-processed image according to the adjusted prediction probability of each image region.

19 Claims, 7 Drawing Sheets

(51) Int. Cl.
  *G06V 10/40*     (2022.01)
  *G06V 10/764*    (2022.01)
  *G06V 10/82*     (2022.01)
(52) U.S. Cl.
  CPC .... *G06V 10/82* (2022.01); *G06T 2207/20021*
    (2013.01); *G06T 2207/30168* (2013.01)
(58) Field of Classification Search
  CPC ...... G06T 7/0004; G06V 10/22; G06V 10/40;
      G06V 10/764; G06V 10/82; G06V 10/25;
        G06V 10/44; G06N 3/04; G06N 3/08
  See application file for complete search history.

(56)                References Cited

U.S. PATENT DOCUMENTS

| | | | | |
|---|---|---|---|---|
| 2006/0204103 A1* | 9/2006 | Mita | ................... | G06V 10/446 |
| | | | | 382/103 |
| 2007/0019104 A1* | 1/2007 | Inoue | .................. | H04N 23/687 |
| | | | | 348/222.1 |
| 2008/0186386 A1* | 8/2008 | Okada | ................... | H04N 23/68 |
| | | | | 348/208.4 |
| 2008/0238942 A1* | 10/2008 | Sun | .......................... | G06T 5/77 |
| | | | | 345/634 |
| 2013/0022273 A1* | 1/2013 | Yamazoe | ............. | G06V 10/993 |
| | | | | 382/190 |
| 2015/0036900 A1* | 2/2015 | Vik | .......................... | G06T 7/12 |
| | | | | 382/128 |
| 2017/0061968 A1* | 3/2017 | Dalmasso | ............... | G10L 17/08 |
| 2018/0182099 A1* | 6/2018 | Lesniak | ................ | G06V 10/993 |
| 2019/0145902 A1* | 5/2019 | Tan | .......................... | H04L 67/12 |
| | | | | 702/35 |
| 2019/0304092 A1* | 10/2019 | Akselrod-Ballin | .... | G06N 3/084 |
| 2019/0377986 A1* | 12/2019 | Ferrari | ............ | G06V 30/19173 |
| 2020/0104567 A1* | 4/2020 | Tajbakhsh | ............ | G06V 40/165 |
| 2020/0302053 A1* | 9/2020 | Arora | ...................... | G06F 21/32 |
| 2020/0327359 A1* | 10/2020 | Blundell | ................. | G06F 18/22 |
| 2021/0004965 A1 | 1/2021 | Tung et al. | | |
| 2021/0192714 A1* | 6/2021 | Bhatt | .................... | G06T 7/0004 |
| 2021/0287047 A1* | 9/2021 | Gao | ...................... | G06T 3/4046 |
| 2021/0303919 A1* | 9/2021 | Niu | ....................... | G06F 18/253 |
| 2021/0365722 A1* | 11/2021 | Masuda | ............... | G06F 18/285 |
| 2022/0309640 A1* | 9/2022 | Liu | .................... | G01N 21/8851 |
| 2024/0037749 A1* | 2/2024 | Rasoulidanesh | ..... | G06V 10/806 |

FOREIGN PATENT DOCUMENTS

| | | |
|---|---|---|
| CN | 110508510 A | 11/2019 |
| CN | 110516677 A | 11/2019 |
| CN | 111709471 A | 9/2020 |

OTHER PUBLICATIONS

International Search Report for PCT/CN2021/108838 dated Dec.
16, 2021.
Written Opinion for PCT/CN2021/108838 dated Dec. 16, 2021.

* cited by examiner

```
┌─────────────────────────────────────────┐
│  Perform feature extraction processing   │    S201
│  on N image regions of a                 │  /
│  to-be-processed image respectively, to  │
│  obtain feature data corresponding to    │
│  the N image regions respectively        │
└─────────────────────────────────────────┘
                    │
                    ▼
┌─────────────────────────────────────────┐
│  Perform defect detection on the N image │    S202
│  regions respectively according to the   │  /
│  feature data corresponding to the N     │
│  image regions respectively, to obtain a │
│  prediction probability of a defect in   │
│  each of the N image regions             │
└─────────────────────────────────────────┘
                    │
                    ▼
┌─────────────────────────────────────────┐
│  Obtain attention for each image region, │    S203
│  and adjust the prediction probability   │  /
│  of the defect in each image region      │
│  according to the attention for each     │
│  image region                            │
└─────────────────────────────────────────┘
                    │
                    ▼
┌─────────────────────────────────────────┐
│  Generate a prediction result of the     │    S204
│  to-be-processed image and a confidence  │  /
│  of the prediction result according to   │
│  the adjusted prediction probability of  │
│  each image region                       │
└─────────────────────────────────────────┘
```

FIG. 2

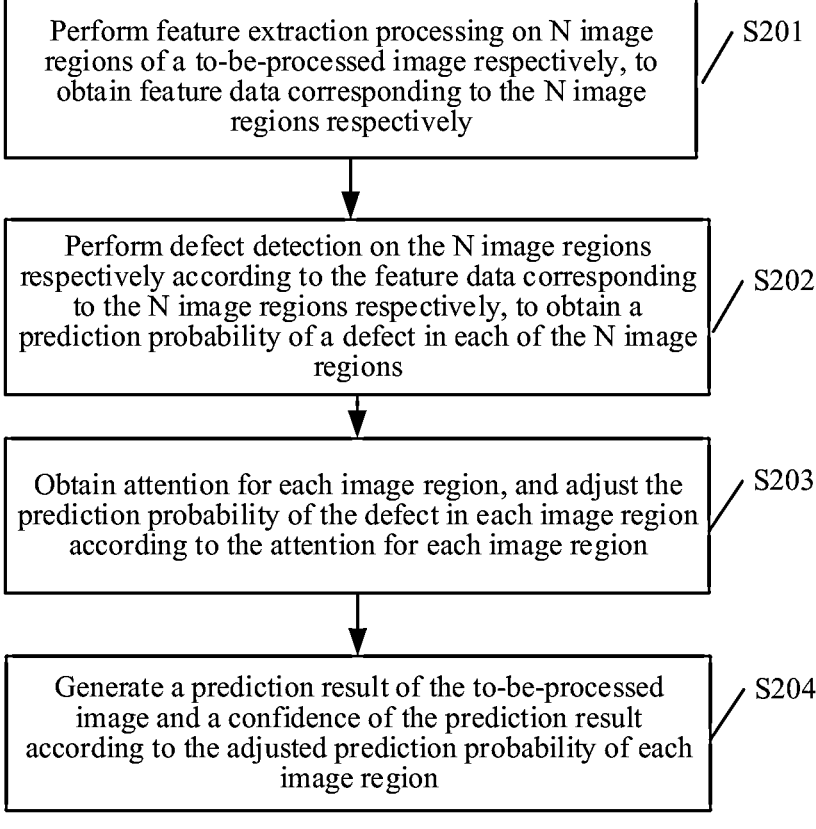

FIG. 3

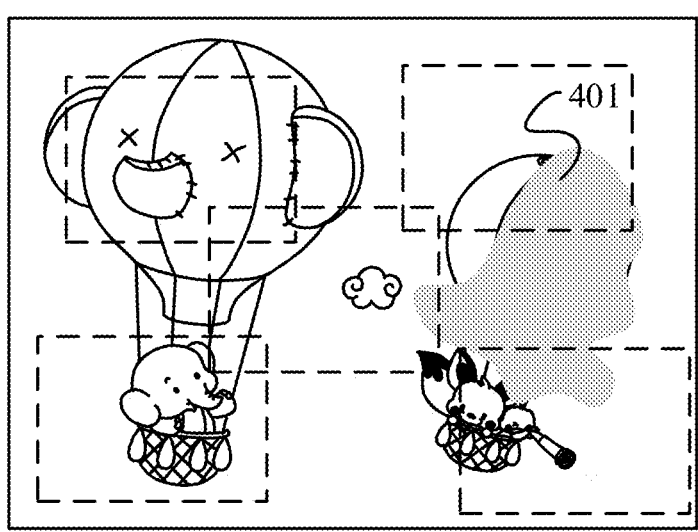

FIG. 4

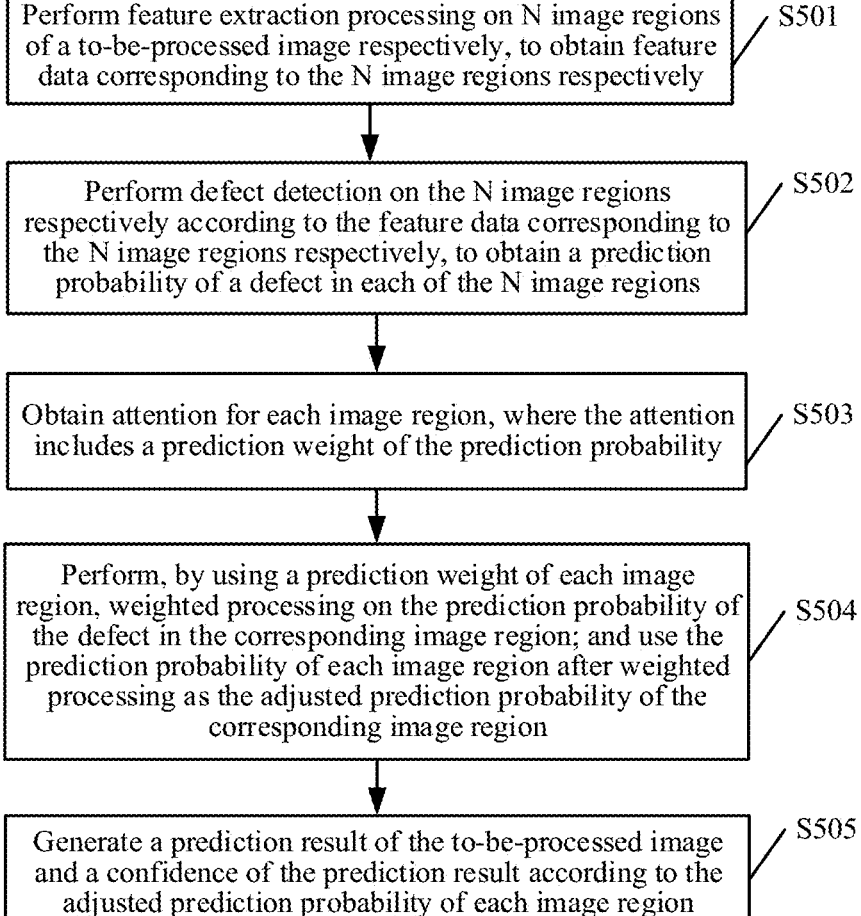

| |
|---|
| Perform feature extraction processing on N image regions of a to-be-processed image respectively, to obtain feature data corresponding to the N image regions respectively |

S501

| |
|---|
| Perform defect detection on the N image regions respectively according to the feature data corresponding to the N image regions respectively, to obtain a prediction probability of a defect in each of the N image regions |

S502

| |
|---|
| Obtain attention for each image region, where the attention includes a prediction weight of the prediction probability |

S503

| |
|---|
| Perform, by using a prediction weight of each image region, weighted processing on the prediction probability of the defect in the corresponding image region; and use the prediction probability of each image region after weighted processing as the adjusted prediction probability of the corresponding image region |

S504

| |
|---|
| Generate a prediction result of the to-be-processed image and a confidence of the prediction result according to the adjusted prediction probability of each image region |

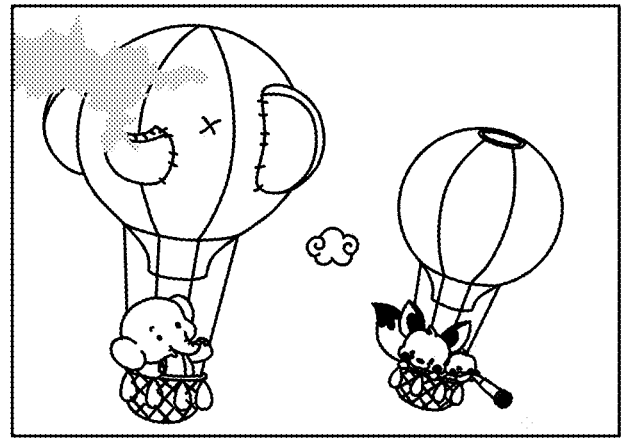
Slight defect
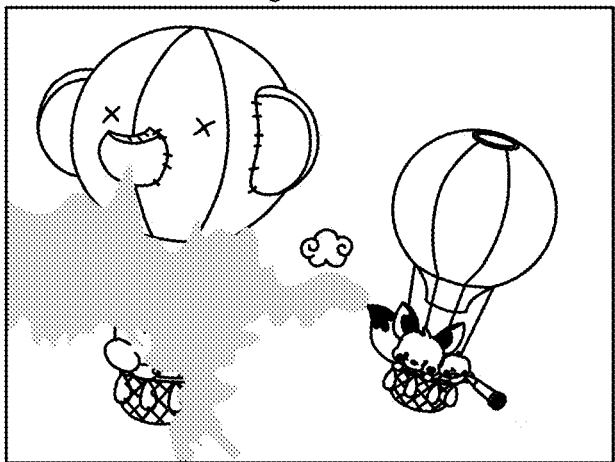
Local defect
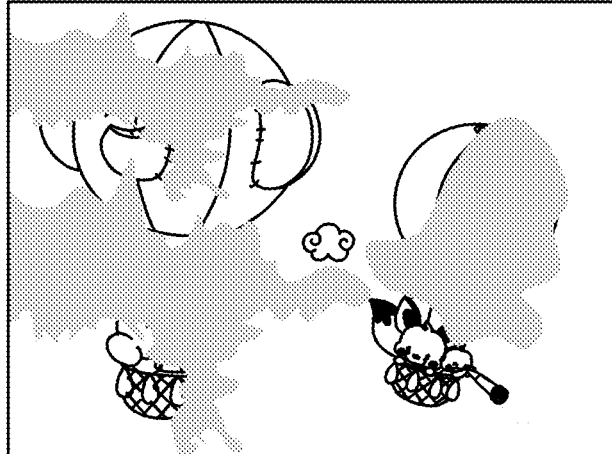
Full-image defect
FIG. 8

IMAGE PROCESSING METHOD AND APPARATUS, SYSTEM, AND STORAGE MEDIUM

CROSS-REFERENCE TO RELATED APPLICATION(S)

This application is a continuation application of International Application No. PCT/CN2021/108838, filed on Jul. 28, 2021, which claims priority to Chinese Patent Application No. 202110283503.4, filed with the China National Intellectual Property Administration on Mar. 16, 2021, the disclosures of which are incorporated by reference in their entireties.

FIELD

The disclosure relates to the field of computer technologies, and in particular, to an image processing method and apparatus, a device, and a storage medium.

BACKGROUND

To detect defects (defects that make images unclear, for example, blurred screens) in the images, a defect detection method in the related art usually first extracts features of a to-be-processed image, and then recognizes the extracted features. If it is determined that there is a defect feature in the extracted feature, the to-be-processed image is determined as a defect image. It can be seen that when the current image detection method is used to perform defect detection on an image, whether a result is that the image is a defect image is outputted by binary classification only based on recognition of feature data. Because many defect images have only slight defects, local defects or small area defects, and because of a limitation of features extracted from the image, it is unreliable to determine whether the image is a defect image based on the recognition result of the feature data. Therefore, how to improve accuracy of recognizing whether an image is a defect image becomes a current research focus.

SUMMARY

According to embodiments of the disclosure, provide an image processing method and apparatus, a device, and a storage medium, which can improve accuracy of a recognition result of recognizing whether an image is a defect image.

Some embodiments of the disclosure may provide an image processing method, performed by an image processing device, the method including: performing feature extraction processing on N image regions of a to-be-processed image respectively, to obtain feature data corresponding to the N image regions respectively, N being an integer greater than or equal to 1; performing defect detection on the N image regions respectively according to the feature data corresponding to the N image regions respectively, to obtain a prediction probability of a defect in each of the N image regions; obtaining attention for each image region; adjusting the prediction probability of the defect in each image region according to the attention for each image region; and generating a prediction result of the to-be-processed image according to the adjusted prediction probability of each image region, the prediction result indicating whether the to-be-processed image is a defect image.

Some embodiments of the disclosure may provide an image processing apparatus, including at least one memory configured to store computer program code and at least one processor configured to operate as instructed by the computer program code, the computer program code including: extraction code configured to cause at least one of the at least one processor to perform feature extraction processing on N image regions of a to-be-processed image respectively, to obtain feature data corresponding to the N image regions respectively, N being an integer greater than or equal to 1; detection code configured to cause at least one of the at least one processor to perform defect detection on the N image regions respectively according to the feature data corresponding to the N image regions respectively, to obtain a prediction probability of a defect in each of the N image regions; obtaining code configured to cause at least one of the at least one processor to obtain attention for each image region; adjustment code configured to cause at least one of the at least one processor to adjust the prediction probability of the defect in each image region according to the attention for each image region; and generation code configured to cause at least one of the at least one processor to generate a prediction result of the to-be-processed image according to the adjusted prediction probability of each image region, the prediction result indicating whether the to-be-processed image is a defect image.

Some embodiments of the disclosure may provide an image processing device, including a processor, an input device, an output device and a memory, the processor, the input device, the output device, and the memory being connected to each other, the memory being configured to store a computer program that supports the image processing device in performing the foregoing method, the computer program including program instructions, and the processor being configured to invoke the program instructions, to perform the foregoing image processing method.

Some embodiments of the disclosure may provide a non-transitory computer-readable storage medium storing computer code that when executed by at least one processor causes the at least one processor to perform the foregoing image processing method.

Some embodiments of the disclosure may provide a computer program product or a computer program, the computer program product or the computer program including computer instructions, the computer instructions being stored in a computer-readable storage medium. A processor of a computer device reads the computer instructions from the computer-readable storage medium, and executes the computer instructions, to cause the computer device to perform the image processing method.

In some embodiments, after obtaining a to-be-processed image, an image processing device may extract one or more pieces of feature data from each image region of the to-be-processed image respectively, and then the image processing device may perform defect detection on each image region of the to-be-processed image according to the extracted feature data, to obtain a prediction probability of whether each image region has a defect. In addition, the image processing device further obtains attention for each image region, and then adjusts the determined prediction probability of whether each image region has the defect based on the attention for each image region, thereby generating a prediction result of the to-be-processed image by using the adjusted prediction probability. Because the feature data is extracted by the image processing device based on different image regions, the image processing device can fully consider a local feature of the to-be-processed image, and adjust prediction probabilities of whether different image regions have defects based on the attention for each image region. In this way, the prediction result is obtained by the image processing device by performing adaptive integration according to different attention for different image regions, and the obtained prediction result is more smooth, thereby improving accuracy of performing defect prediction on the to-be-processed image.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

FIG. 2 is a schematic flowchart of an image processing method according to some embodiments.

FIG. 3 is a schematic diagram of segmentation of a to-be-processed image according to some embodiments.

FIG. 4 is a schematic diagram of segmentation of a to-be-processed image according to some embodiments.

FIG. 5 is a schematic flowchart of an image processing method according to some embodiments.

FIG. 8 is a schematic diagram of images with different defect degrees according to some embodiments.

DESCRIPTION OF EMBODIMENTS

Figure 1:
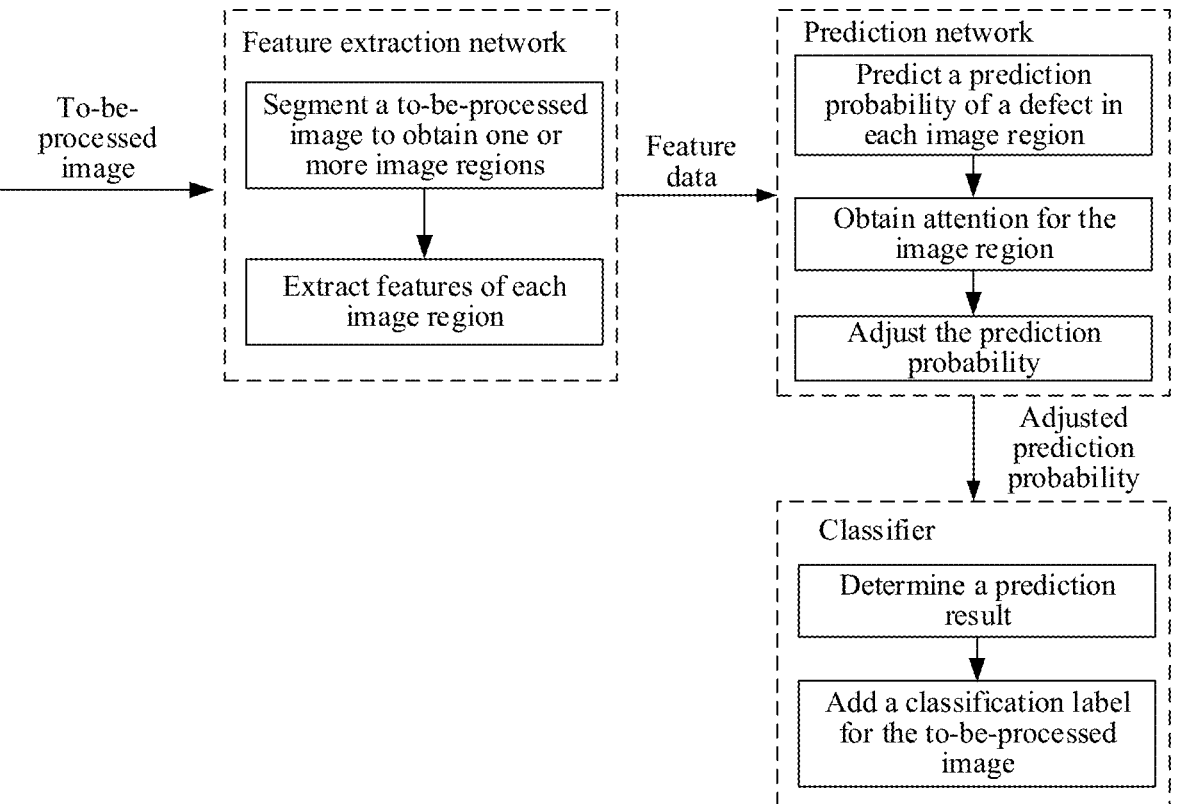
FIG. 1 is a schematic diagram of an image processing method according to some embodiments.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

In the following descriptions, references to "some embodiments" describe a subset of all possible embodiments. However, it may be understood that the "some embodiments" may be the same subset or different subsets of all the possible embodiments, and may be combined with each other without conflict.

Embodiments of the disclosure provide an image processing method. An image processing device fully considers attention for different image regions in a to-be-processed image. According to attention for each image region in the to-be-processed image, defect detection is performed on different image regions to obtain prediction probabilities corresponding to the image regions respectively, and adaptive integration is performed on the plurality of prediction probabilities, to generate a prediction result of whether the to-be-processed image has a defect. In a process of obtaining the prediction result of whether the to-be-processed image has the defect, the attention for different image regions in the to-be-processed image is investigated, so that the image processing device can obtain a more accurate prediction result, thereby improving prediction accuracy of the image processing device. A defect image is an image whose image information is incomplete due to defects, and the defect image leads to unclear display of an original image, affecting viewing of a user for the original image. For example, the defect image may be a blurred-screen image or a blurred image. The blurred-screen image refers to an image covered with dotted, flake, or mosaic interference in the original image, and the blurred image refers to an image with a lower resolution. Defect detection is detection used for determining whether an image has the foregoing detect. In some embodiments, after defect detection is performed on an image, a probability that the detected image (such as the to-be-processed image) is a defect image is outputted, and then a binary detection result of whether the detected image is the defect image may be determined based on the probability. Afterwards, the image processing device determines a subsequent processing rule for the detected image according to the binary detection result of the detected image. In some embodiments, if the binary detection result of the detected image is that the detected image is the defect image, the image processing device first performs image restoration processing on the detected image, to eliminate the defect in the detected image, and then outputs the restored image for display. In some embodiments, if the image processing device determines that the binary detection result of the detected image is that the detected image is a normal image, the detected image may be directly outputted for display.

In some embodiments, the image processing method may invoke a trained recognition model in the image processing device for performing. The trained recognition model may be shown in FIG. 1 when performing the image processing method. The trained recognition model includes a feature extraction network, a prediction network, and a classifier. The feature extraction network is configured to extract image features, where the image features include a gradient feature, a texture feature, and the like. The feature extraction network may be a convolutional neural network (CNN) structure, and the convolutional neural network may be any convolutional neural network. Moreover, in some embodiments, a neural network with a large or small amount of calculation may be used based on an actual application requirement, so that when the trained recognition model uses the feature extraction network for image feature extraction, feature extraction efficiency can also be ensured on the basis of obtaining a better extraction effect. In some embodiments, the prediction network is configured to perform detect prediction on the to-be-processed image according to feature data extracted by the feature extraction network, and determine a prediction result of the to-be-processed image. The classifier is configured to perform binary classification on whether the to-be-processed image is a defect image according to the prediction result obtained by the prediction network. A result of the binary classification indicates that the to-be-processed image is determined as the defect image, or the to-be-processed image is a non-defect image (that is, a normal image). In some embodiments, the classifier may be a support vector machine (SVM) classifier, or may be a tree-based classifier. In some embodiments, a specific network structure in the trained recognition model is not limited. When the image processing device invokes the trained recognition model to process the to-be-processed image, as shown in FIG. 1, the following operations are performed:

①After determining a to-be-processed image, an image processing device inputs the to-be-processed image into a trained recognition model. After obtaining the to-be-processed image, the trained recognition model first invokes a feature extraction network to perform image segmentation processing on the to-be-processed image to obtain one or more image regions of the to-be-processed image. Further, the feature extraction network may perform feature extraction on each image region to extract one or more pieces of feature data from each image region. After extracting the feature data of each image region, the feature extraction network sends the extracted feature data to a prediction network.

②After obtaining the feature data sent by the feature extraction network, the prediction network predicts a prediction probability of a defect in each image region according to the obtained feature data, and further obtains attention for each image region after predicting the prediction probability of the defect in each image region, thereby adjusting the prediction probability of the defect in the corresponding image region according to the attention for each image region, and sending the adjusted prediction probability to a classifier.

③After obtaining the adjusted prediction probability from the prediction network, the classifier determines a prediction result of the to-be-processed image according to a defect classification result, and the classifier may further add a classification label for the to-be-processed image according to the obtained prediction result. In some embodiments, the classification label added by the classifier for the to-be-processed image includes a label for indicating that the to-be-processed image is the defect image and a label for indicating that the to-be-processed image is a normal image. The label for indicating that the to-be-processed image is the defect image may be 1, and correspondingly, the label for indicating that the to-be-processed image is the normal image may be 0. In some embodiments, a label form of the classification label added by the classifier for the to-be-processed image is not limited.

FIG. 2 is a schematic flowchart of an image processing method according to some embodiments. The image processing method may be performed by the foregoing image processing device. As shown in FIG. 2, the method may include the following operations:

S201: Perform feature extraction processing on N image regions of a to-be-processed image to obtain feature data corresponding to the N image regions.

In some embodiments, the to-be-processed image may be any picture image or any image frame in a video. The image processing device may first perform image segmentation processing on the to-be-processed image after obtaining the to-be-processed image, so as to obtain the N image regions of the to-be-processed image, where N is an integer greater than or equal to 1. When the image processing device performs image segmentation on the to-be-processed image, the image processing device may segment the to-be-processed image by using a regular segmentation manner (or sampling manner) shown in FIG. 3, to ensure that segmented image regions may cover a full-image region of the to-be-processed image. Moreover, because the image processing device performs subsequent feature extraction based on each segmented image region, the image processing device can ensure that all features of the to-be-processed image are obtained subsequently. Therefore, the image processing device avoids a problem of omission of feature extraction of a local defect in the to-be-processed image because the to-be-processed image only has the local defect or a slight defect, thereby ensuring reliability of the feature data extracted by the image processing device. As shown in FIG. 3, if N=5, the to-be-processed image may be an image marked by 301 in FIG. 3. Based on the image segmentation processing on the to-be-processed image, the five image regions obtained by the image processing device may be image regions marked by dashed boxes in FIG. 3. In some embodiments, an example in which a defect image is a blurred-screen image is used for detailed description. When the defect image is an image with other defects, reference may also be made to some embodiments. In addition, in some embodiments, an original image is blocked by using a gray scale, and the blurred-screen image is used for schematic description. A blurred screen in the image may be, for example, a gray scale region marked by 301 in FIG. 3.

In some embodiments, when the image processing device performs segmentation processing on the to-be-processed image to obtain the N image regions of the to-be-processed image, the image processing device may further obtain the N image regions randomly from the to-be-processed image based on image content in the to-be-processed image. As shown in FIG. 4, the defect in the image may also be a gray scale region marked by 401 in FIG. 4. When randomly obtaining the N image regions from the to-be-processed image based on image content, the image processing device first determines an image element that has a greater impact on viewing experience of a user when the defect occurs in the image content, and then the image processing device selects a region of the image element that has a greater impact on the viewing experience of the user as an image region of the to-be-processed image. For example, if the image content of the to-be-processed image includes a figure image, it can be considered that when there is a defect, the figure image in the to-be-processed image greatly affects the viewing experience of the user. Therefore, the image processing device may select a region including a figure feature (such as a face feature, a hand feature, or the like) as an image region of the to-be-processed image. In some embodiments, if it is considered that a defect of a central part of the to-be-processed image greatly affects the viewing experience of the user, the image processing device selects the central region of the to-be-processed image as an image region of the to-be-processed image after obtaining the to-be-processed image. It may be understood that other manners of segmenting the to-be-processed image to obtain one or more image regions of the to-be-processed image may also be applicable to some embodiments.

After the image processing device obtains the N image regions from the to-be-processed image, feature extraction may be performed on each image region, to obtain the feature data corresponding to the N image regions respectively. One image region corresponds to one or more pieces of feature data, and N is an integer greater than or equal to 1. After the image processing device obtains a plurality of pieces of feature data, defect detection may be performed on a corresponding image region according to the feature data, to obtain a prediction probability of a defect in each image region. In some embodiments, the image processing device may extract one or more pieces of feature data from each image region when performing feature extraction on each image region. In some embodiments, when extracting a plurality of pieces of feature data from each image region, the image processing device also directly performs defect detection on the image region based on the plurality of pieces of feature data of the image region, to obtain the prediction probability of the defect in the image region. In some embodiments, when extracting a plurality of pieces of feature data from each image region, the image processing device may also first perform feature fusion on the plurality of pieces of extracted feature data to obtain target feature data corresponding to the image region, and then perform defect detection on the image region based on the obtained target feature data, to determine the prediction probability of the defect in the image region.

S202: Perform defect detection on the N image regions according to the feature data corresponding to the N image regions to obtain a prediction probability of a defect in each of the N image regions.

After extracting a plurality of pieces of feature data from the N image regions of the to-be-processed image, the image processing device may perform defect detection on each image region of the to-be-processed image based on the plurality of pieces of extracted feature data. It may be understood that the defect detection performed by the image processing device on each image region is used for determining whether the to-be-processed image has the defect and the probability of the defect in the image region. Based on the plurality of pieces of feature data extracted by the image processing device, the prediction probability of the defect in each image region is obtained through defect detection for each image region. A probability value corresponding to the prediction probability of the defect may be used for reflecting a possibility of the defect in the corresponding image region. In some embodiments, after the image processing device performs defect detection on an image region, if an obtained prediction probability of a defect in the image region is high, it indicates that a possibility of the defect in the image region is high. For example, if a prediction probability of a defect in an image region is 0.9, the image processing device may consider that the image region is most likely to be defective.

In some embodiments, when performing defect detection on the N image regions according to the plurality of pieces of feature data, the image processing device performs defect detection on each of the N image regions. When performing defect detection on each image region based on the plurality of pieces of feature data, the image processing device may perform defect detection on the corresponding image region according to the one or more pieces of feature data corresponding to each image region in the plurality of pieces of feature data. For example, if an image region on which the image processing device currently performs defect detection is an image region A in the to-be-processed image, and feature data extracted from the image region A includes feature data 1 and feature data 2, when the image processing device performs defect detection on the image region A, the image processing device selects the feature data 1 and the feature data 2 from the plurality of pieces of obtained feature data, and performs defect detection on the image region A by using the feature data 1 and the feature data 2. In some embodiments, when performing defect detection on each image region, in addition to referring to the feature data extracted from the detected image region, the image processing device may further refer to feature data extracted from other image regions adjacent to the detected image region. For example, if a current image region for defect detection is an image region A in the to-be-processed image, feature data extracted from the image region A includes feature data 1 and feature data 2, and image regions adjacent to the image region A include an image region B, the image processing device selects the feature data 1 and the feature data 2 from the plurality of pieces of obtained feature data when performing defect detection on the image region A, and further obtains feature data (assumed to be feature data 3) extracted from the image region B. Therefore, the image processing device performs defect detection on the image region A by using the feature data 1, the feature data 2, and the feature data 3.

It may be understood that a process in which the image processing device performs defect detection on each image region based on the feature data is a process of performing feature recognition on each feature data. The image processing device may be a terminal device, and the terminal device may be a smartphone, a tablet computer, a notebook computer, a desktop computer, a smart speaker, a smartwatch, or the like. In some embodiments, the image processing device may also be a server, and the server may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence (AI) platform. In addition, the image processing device may also be a processing module in a terminal device or a server. After determining the prediction probability of the defect in each image region, the image processing device may generate a prediction result of the to-be-processed image and a confidence of the prediction result based on attention for each image region and with reference to the prediction probability of the defect in each image region.

S203: Obtain attention for each image region, and adjust the prediction probability of the defect in each image region according to the attention for each image region.

S204: Generate a prediction result of the to-be-processed image according to the adjusted prediction probability of each image region.

In operations S203 and S204, the image processing device may further obtain the attention for each image region after determining the prediction probability of the defect in each image region in the to-be-processed image. In some embodiments, the attention for each image region may be preset in the image processing device by a skilled person based on an empiric value of whether an image has a defect. For example, according to the empirical value, a probability of a defect in an image related to a person is high. Therefore, when the image processing device obtains attention corresponding to an image region in the to-be-processed image, if the image region is an image region related to a person, attention for the image region is high. For example, the image processing device determines that the to-be-processed image includes an image region A and an image region B, respectively. The image region A includes content related to the person (such as a face image), while the image region B does not include the content related to the person. Therefore, attention obtained by the image processing device for the image region A is greater than attention obtained for the image region B. In some embodiments, the image processing device may also determine the attention for each image region according to a degree of influence of each defective image on viewing of the user for the image. For example, when an image center region of an image is defective, a degree of influence on viewing of the user for the image is high, and when an edge position of an image is defective, a degree of influence on viewing of the user for the image is low. If the image processing device determines that the obtained to-be-processed image includes an image region A and an image region B, the image region A is a center region image of the to-be-processed image, and the image region B is an edge region image of the to-be-processed image, attention obtained by the image processing device for the image region A is greater than attention obtained for the image region B.

In addition, in some embodiments, the image processing device may also determine the attention for each image by using an attention mechanism. The attention mechanism is similar to an attention mechanism of human vision, which uses an AI technology to enable a machine (such as the image processing device) to focus on an important point in more pieces of information, select key information, and ignore other unimportant information. Based on the attention mechanism, the image processing device may determine an image region that needs attention from the to-be-processed image, and attention for the image region that needs attention is greater than attention for an image region that does not need attention. The AI technology is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science, and attempts to understand the essence of intelligence and produce a new intelligent machine that can react in a manner similar to human intelligence. AI is to study design principles and implementation methods of various intelligent machines, so that the machines can perceive, infer, and make decisions.

After the image processing device obtains the attention for each image region, the prediction probability of the defect in the corresponding image region may be adjusted according to the attention for each image region. In some embodiments, when adjusting the prediction probability of the defect in the corresponding image region based on the attention corresponding to the image region, the image processing device may adjust the prediction probability of the defect in each corresponding image region according to a certain ratio, and the adjustment ratio is positively correlated with the attention for each image region. That is, if attention for an image region obtained by the image processing device is greater than attention obtained for another image region, an adjustment ratio of the image processing device for a prediction probability of a defect in the image region is greater than an adjustment ratio for a prediction probability of a defect in the another image region. For example, if the attention obtained by the image processing device for the image region A is greater than the attention for the image region B, the image processing device may adjust the prediction probability of the defect in the image region A by a ratio a, and adjust the prediction probability of the defect in the image region B by a ratio b, and a is greater than b.

After adjusting the prediction probability of the defect in the corresponding image region based on the attention for each image region, the image processing device may obtain the adjusted prediction probability of the defect corresponding to each image region. Then, after obtaining the adjusted prediction probability of each image region, the image processing device further generates the prediction result of the to-be-processed image and the confidence of the prediction result based on the adjusted prediction probability of each image region. The prediction result is used for indicating whether the to-be-processed image is a defect image. When the image processing device generates the prediction result of the to-be-processed image based on the adjusted prediction probability of each image region, if an adjusted prediction probability of an image region is greater than or equal to a prediction threshold, it may be considered that the prediction result of the to-be-processed image is that the to-be-processed image is the defect image; and if adjusted prediction probabilities of all the image regions are less than the prediction threshold, it may be considered that the prediction result of the to-be-processed image is that the to-be-processed image is a normal image. To ensure prediction accuracy of the image processing device, when determining whether the to-be-processed image is the defect image based on a prediction probability of whether there is a defect, the image processing device may set the prediction threshold to a small value, such as 0 or 0.1, so that the image processing device can effectively avoid missing detection of the defect image. In addition, the image processing device may further determine the confidence of the prediction result of the to-be-processed image according to the adjusted prediction probability. In some embodiments, the image processing device may directly use the adjusted prediction probability as the confidence of the prediction result corresponding to the to-be-processed image, or the image processing device may also use a normalized prediction result as the confidence of the prediction result of the to-be-processed image after performing normalization processing on the prediction result.

In some embodiments, after obtaining a to-be-processed image, an image processing device may extract one or more pieces of feature data from each image region of the to-be-processed image respectively, and then the image processing device may perform defect detection on each image region of the to-be-processed image according to the extracted feature data, to obtain a prediction probability of a defect in each image region. In addition, the image processing device further obtains attention for each image region, and then adjust the prediction probability of the defect in each image region based on the attention for each image region, thereby generating a prediction result of the to-be-processed image and a confidence of the prediction result by using the adjusted prediction probability. Because the feature data is extracted by the image processing device based on different image regions, the image processing device can fully consider a local feature of the to-be-processed image, and adjust prediction probabilities of whether different image regions have defects based on the attention for each image region. In this way, the prediction result is obtained by the image processing device by performing adaptive integration according to different attention for different image regions, and the prediction result is more smooth, thereby improving accuracy of performing defect prediction on the to-be-processed image.

In some embodiments, the image processing device performs the foregoing image processing method by using a recognition model, and the recognition model includes a feature extraction network, a prediction network, and a classifier. The feature extraction network is configured to perform feature extraction processing on the N image regions of the to-be-processed image respectively, to obtain feature data corresponding to the N image regions respectively. The prediction network is configured to perform defect detection on the N image regions respectively according to the feature data corresponding to the N image regions respectively, to obtain the prediction probability of the defect in each of the N image regions; determine a focus region from the to-be-processed image by using the attention mechanism; obtain, for a target image region among the N image regions, an overlapping region between the target image region and the focus region; determine attention for the target image region according to an area of the overlapping region; and adjust the prediction probability of the defect in each image region according to the attention for each image region. The classifier is configured to generate the prediction result of the to-be-processed image according to the adjusted prediction probability of each image region.

FIG. 5 is a schematic flowchart of an image processing method according to some embodiments. The image processing method may also be performed by the foregoing image processing device. As shown in FIG. 5, the method may include the following operations:

S501: Perform feature extraction processing on N image regions of a to-be-processed image respectively, to obtain feature data corresponding to the N image regions respectively.

S502: Perform defect detection on the N image regions respectively according to the feature data corresponding to the N image regions respectively, to obtain a prediction probability of a defect in each of the N image regions.

Figure 6:
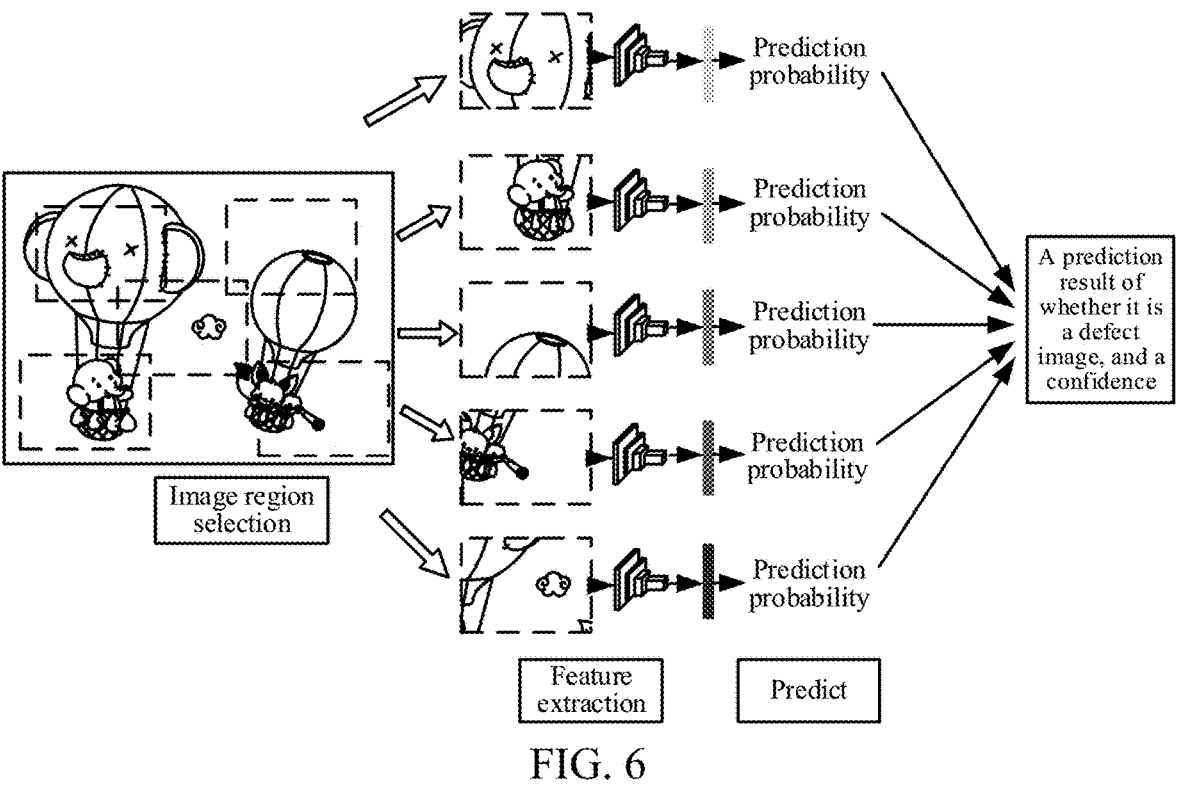
FIG. 6 is a schematic diagram of performing defect prediction according to some embodiments.

In operation S501 and operation S502, after obtaining the to-be-processed image, the image processing device first divides the to-be-processed image, and then obtains one or more divided image regions. After obtaining the one or more divided image regions, the image processing device may perform feature extraction processing on the image regions by invoking a trained recognition model, to obtain one or more pieces of feature data corresponding to each image region. In some embodiments, when obtaining the one or more divided image regions, the image processing device may first perform plane interpolation processing on each divided image region, to adjust a size of each image region, where the adjusted size of each image region is same, and further, the image processing device uses an adjusted image region as a divided image region. As shown in FIG. 6, the image processing device may perform random image block cropping processing on the to-be-processed image after obtaining the to-be-processed image, and the image processing device may perform plane interpolation processing on cropped image blocks after obtaining the cropped image blocks (or image regions), so that the cropped image blocks are of a fixed size, for example, may be of a size of 224 mm×224 mm. Further, the image processing device performs feature extraction on each obtained image region through a convolutional neural network. A weight of the convolutional neural network is shared, so that it is not necessary to train five convolutional neural networks, thereby greatly saving parameters and a computing capability of a graphics processing unit (GPU). For feature data extracted from each image region, the image processing device may keep the feature data extracted from each image region unchanged, to perform defect detection processing on the corresponding image region based on the feature data extracted from each image region. In some embodiments, the image processing device may also perform feature fusion on the feature data extracted from each image region, and then determine the prediction probability of the defect in the corresponding image region based on the fused feature data corresponding to each image region, to obtain a prediction result of the to-be-processed image and a corresponding confidence.

In some embodiments, the image processing device may segment the to-be-processed image according to the manner shown in FIG. 6, or the image processing device may segment the to-be-processed image according to the regular sampling manner shown in FIG. 3, to achieve full coverage of the region of the to-be-processed image. After completing the segmentation of the to-be-processed image to obtain a plurality of image regions, the image processing device performs feature extraction on each image region, to obtain the feature data of each image region, and performs defect detection processing on the corresponding image region according to the feature data of each image region to obtain the prediction probability of the defect in each image region. After obtaining the prediction probability of the defect in each image region, the image processing device may further obtain attention for each image region.

S503: Obtain attention for each image region, where the attention includes a prediction weight of the prediction probability.

S504: Perform, by using a prediction weight of each image region, weighted processing on the prediction probability of the defect in the corresponding image region, and use the prediction probability of each image region after weighted processing as an adjusted prediction probability of the corresponding image region.

Figure 7:
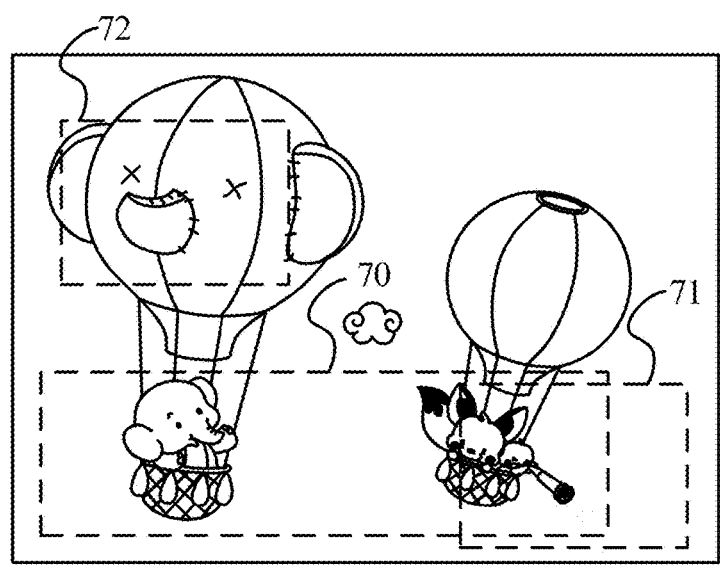
FIG. 7 is a schematic diagram of determining attention for an image region according to some embodiments.

In operation S503 and operation S504, the attention obtained by the image processing device includes the prediction weight of the prediction probability. A manner in which the image processing device obtains attention for a target image region in the N image regions includes: determining a focus region from the to-be-processed image, and obtaining an overlapping region between the target image region and the focus region, so that the image processing device may determine attention for the target image region according to an area of the overlapping region, where the attention for the target image region is positively correlated with the area of the overlapping region. As shown in FIG. 7, if the focus region determined by the image processing device from the to-be-processed image by using an attention mechanism is a region marked by 70 in FIG. 7, the image regions obtained from the to-be-processed image includes a region marked by 71 in FIG. 7 and a region marked by 72 in FIG. 7, because an overlapping area between the focus region 70 and the image region 71 is greater than an overlapping area between the focus region 70 and the image region 72, the image processing device determines that attention for the image region 71 is greater than attention for the image region 72.

In some embodiments, the attention mechanism is included in a trained recognition model. A process of training the recognition model includes: obtaining a sample image, where the sample image is added with an annotation label, and the annotation label is used for indicating whether the sample image is a defect image (such as the foregoing blurred-screen image). If the annotation label is 1, it may indicate that the sample image is the defect image, and if the annotation label is 0, it may indicate that the sample image is not the defect image. After obtaining the sample image, the image processing device invokes the recognition model to determine a prediction label of the sample image, and then adjusts a model parameter of an initial recognition model according to a difference between the prediction label and the annotation label, to obtain the trained recognition model. Because the annotation label added for the sample image is a binary label (such as 0 or 1), and the binary label is only used for indicating whether the image is defective. However, when the defect image has a local defect, such an annotation label is a weak label with high uncertainty. Therefore, when the image processing device trains the recognition model, the attention mechanism is introduced to reduce an impact of the local defect on model training. In some embodiments, if the sample image is also divided into N sample regions, a predicted value of a prediction result of an $i^{th}$ sample region obtained by the recognition model may be $p_i$. When training the recognition model, due to the introduction of the attention mechanism, the image processing device trains an attention parameter $W_i$ which is updated gradually with network training of the recognition model, and the trained attention parameter $W_i$ is used as attention for each sample region, so that the image processing device can integrate a prediction probability of a defect in each sample region. Therefore, after weighted processing is performed on the prediction probability $p_i$ of the defect in each image region by using the attention $W_i$ for each image region, an adjusted prediction probability may be p, and an expression of formula 1 is as follows:

$$p = \sum_i^N W_i * p_i \qquad \text{Formula 1}$$

$W_i$ is the attention for each image region (that is, a prediction weight of the prediction probability of the defect corresponding to each image region), and $p_i$ is the prediction probability of the defect in each image region that is determined through defect detection by using feature data of each image region. In some embodiments, significance of the attention weight $W_i$ is to adaptively evaluate contribution of a current image region to defect classification determining. When the network training gradually converges, a weight value of $W_i$ is lower for an image block without a defect region in the image with the local defect, and higher for a local image block with a defect. In this way, importance of each image block may be fully considered in a fused result, to obtain a stable output result. In other words, that the image processing device adjusts the model parameter of the initial recognition model to obtain the trained recognition model is to adjust the attention parameter, to reduce the difference between the prediction label and the annotation label, and obtain the trained recognition model when the difference between the prediction label and the annotation label reaches a minimum value. In some embodiments, a softmax cross entropy loss function (a logic regression loss function) may be used for indicating the difference between the prediction label and the annotation label. The softmax cross entropy loss function may be shown in Formula 2:

$$\text{Loss}=[y \log p+(1-y)\log(1-p)] \qquad \text{Formula 2}$$

y represents annotation information of whether the sample image is defective (such as an identification label of the sample image). p represents a probability value outputted by the model after integration of a plurality of image regions, and p may be calculated through the formula 1. A loss between the two is used for driving the weight of the model to be updated, to optimize the entire recognition model, thereby completing the optimization of the recognition model, and obtaining the trained recognition model.

After the image processing device obtains the attention for each image region, the image processing device may perform, by using the prediction weight of each image region, weighted processing on the prediction probability of the defect in the corresponding image region, where the weighted prediction probability of each image region is the adjusted prediction probability of the defect in the corresponding image region. After obtaining the adjusted prediction probability of the defect in each image region, the image processing device may turn to perform operation S505.

S505: Generate a prediction result of the to-be-processed image and a confidence of the prediction result according to the adjusted prediction probability of each image region.

In some embodiments, the adjusted prediction probability of the image processing device is the prediction probability after performing weighted processing on the prediction probability of the defect in the corresponding image region, so that the image processing device may generate the prediction result of the to-be-processed image and the confidence of the prediction result based on the prediction probability after weighted processing. In some embodiments, the image processing device may sum the prediction probability of each image region after weighted processing, to obtain the prediction probability after weighted summation, and then determine that the to-be-processed image is the defect image when the prediction probability after weighted summation is greater than a probability threshold. Afterwards, normalization processing is performed on the prediction probability after weighted summation, to obtain the confidence that the to-be-processed image is the defect image. After the image processing device determines the confidence of the prediction result of the to-be-processed image, because the confidence may be used for indicating accuracy of the prediction result, the image processing device may add a defect label for the to-be-processed image when the confidence is greater than or equal to a first threshold; and add a normal label for the to-be-processed image based on the confidence not being greater than or equal to the first threshold, where the first threshold may be, for example, a value such as 0.9 or 0.86. In addition, the confidence may be further used for reflecting a defect degree of the to-be-processed image. It may be understood that a greater confidence indicates a higher corresponding defect degree. The defect degree may be determined based on a defect area, that is, a larger defect area indicates a higher defect degree. As shown in FIG. 8, the image processing device may determine different defect degrees based on defect areas. In addition, the defect degree may also be determined based on a pixel difference in an image. Therefore, after the image processing device determines the confidence of the prediction result of the to-be-processed image, if the confidence is greater than or equal to a second threshold, it indicates that the defect degree of the to-be-processed image is high, and then restoration processing may be performed on the to-be-processed image, to eliminate the defect in the to-be-processed image.

Figure 9:
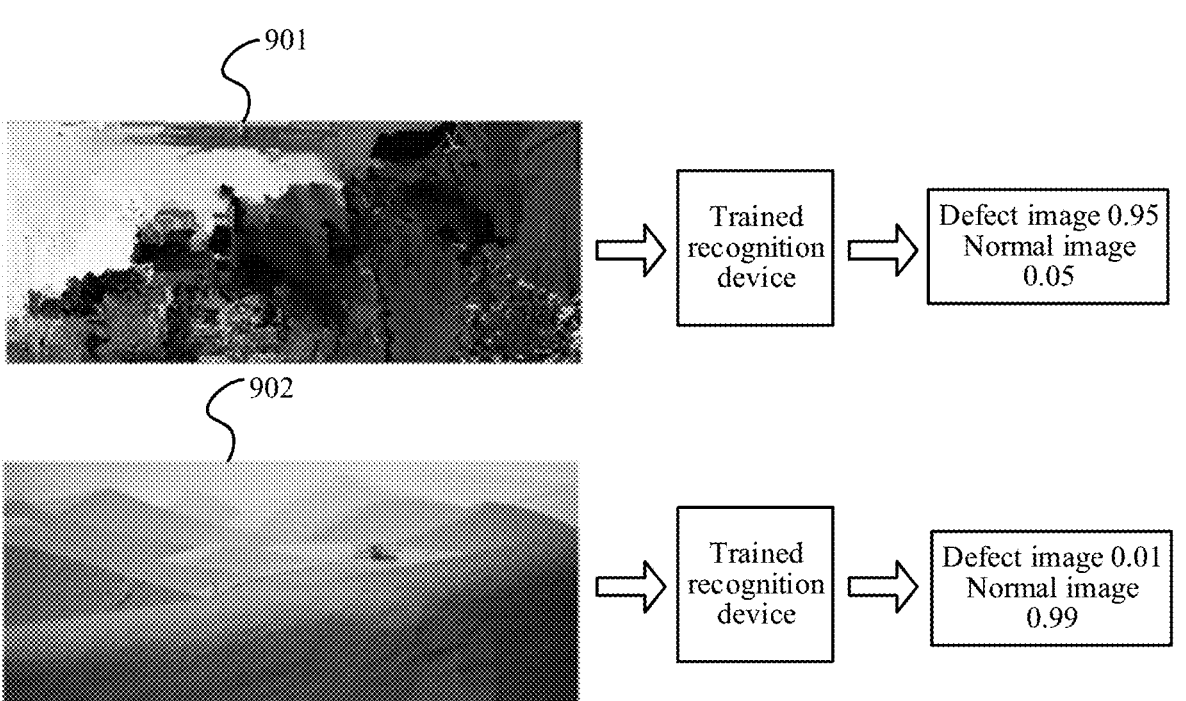
FIG. 9 is a schematic diagram of performing recognition processing on different images according to some embodiments.

In some embodiments, the prediction result and the confidence of the prediction result may be used for detecting image quality. If the to-be-processed image is an image frame in a video, the image processing device may use the video frame as the to-be-processed image, and then determine data quality of video data based on a prediction result of the video frame and a corresponding confidence. As shown in FIG. 9, if the image frame that is used as the to-be-processed image and obtained by the image processing device from the video data is shown in an image marked by 901 in FIG. 9, after obtaining the image frame of the to-be-processed image from the video data, the image processing device may invoke the trained recognition model to obtain a prediction result for the image frame 901 and a corresponding confidence. If a confidence when the outputted prediction result is a defect image is 0.95, and a confidence when the prediction result is a normal image is 0.05, the image processing device may determine that the image frame 901 is the defect image, and a defect degree thereof is high. In some embodiments, if the image frame that is used as the to-be-processed image and obtained by the image processing device from the video data is shown in an image marked by 902 in FIG. 9, after obtaining the image frame of the to-be-processed image from the video data, the image processing device may invoke the trained recognition model to obtain a prediction result for the image frame 902 and a corresponding confidence. If a confidence when the outputted prediction result is a normal image is 0.99, and a confidence when the prediction result is a defect image is 0.01, the image processing device may determine that the image frame 902 is the normal image.

In some embodiments, after obtaining a plurality of image regions from a to-be-processed image and extracting a plurality of pieces of feature data from each of the image regions, an image processing device may perform defect detection on each image region according to the extracted feature data, to obtain a prediction probability of a defect in each image region, perform weighted processing on the prediction probability of the defect in the corresponding image region according to a prediction weight indicated by attention for each image region after obtaining the attention for each image region, and use the prediction probability after weighted processing as an adjusted prediction probability of the corresponding image region, so that the image processing device may generate a prediction result of the to-be-processed image and a confidence of the prediction result according to the adjusted prediction probability of each image region, thereby improving accuracy of the prediction result obtained by performing defect detection on the to-be-processed image.

Figure 10:
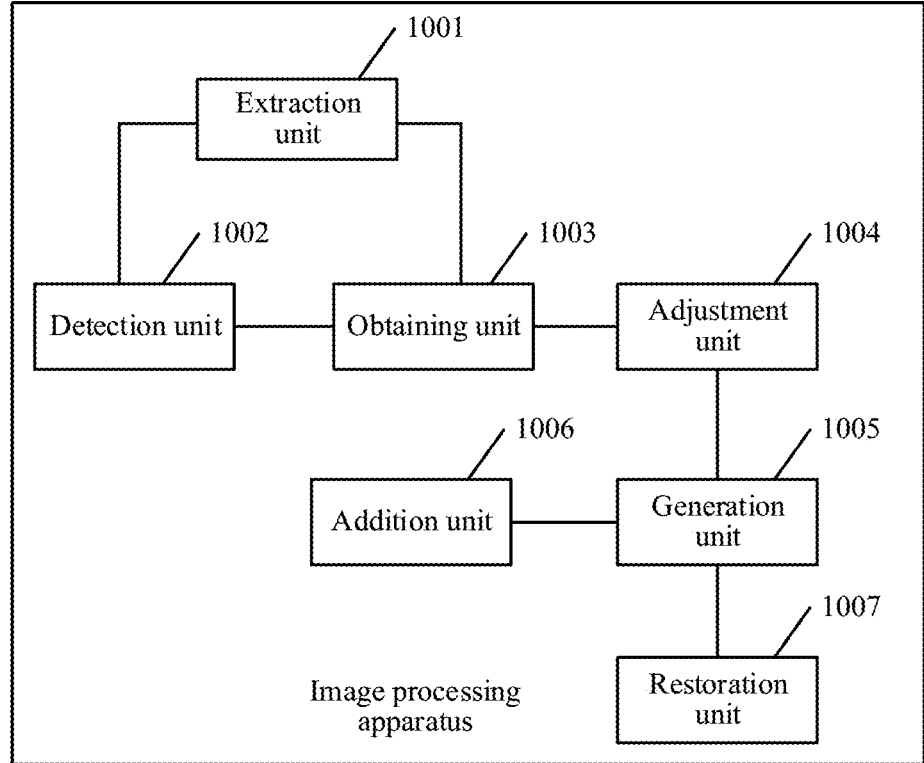
FIG. 10 is a schematic block diagram of an image processing apparatus according to some embodiments.

Some embodiments may further provide an image processing apparatus, which may be a computer program (including program code) run on the image processing device. The image processing apparatus may be configured to perform the image processing methods described in FIG. 2 and FIG. 5. Referring to FIG. 10, the image processing apparatus includes: an extraction unit 1001, a detection unit 1002, an obtaining unit 1003, an adjustment unit 1004, and a generation unit 1005.

The extraction unit 1001 is configured to perform feature extraction processing on N image regions of a to-be-processed image respectively, to obtain feature data corresponding to the N image regions respectively, N being an integer greater than or equal to 1.

The detection unit 1002 is configured to perform defect detection on the N image regions respectively according to the feature data corresponding to the N image regions respectively, to obtain a prediction probability of a defect in each of the N image regions.

The obtaining unit 1003 is configured to obtain attention for each image region.

The adjustment unit 1004 is configured to adjust the prediction probability of the defect in each image region according to the attention for each image region.

The generation unit 1005 is configured to generate a prediction result of the to-be-processed image according to the adjusted prediction probability of each image region, the prediction result indicating whether the to-be-processed image is a defect image.

In some embodiments, the obtaining unit 1003 may be configured to:

determine a focus region from the to-be-processed image;

obtain, for a target image region among the N image regions, an overlapping region between the target image region and the focus region; and determine attention for the target image region according to an area of the overlapping region, where the attention for the target image region is positively correlated with the area of the overlapping region.

In some embodiments, the image processing device performs the image processing method by using a recognition model, and the recognition model includes a feature extraction network, a prediction network, and a classifier. The method further includes: performing feature extraction processing, by the feature extraction network, on the N image regions of the to-be-processed image respectively, to obtain feature data corresponding to the N image regions respectively; performing defect detection, by the prediction network, on the N image regions respectively according to the feature data corresponding to the N image regions respectively, to obtain the prediction probability of the defect in each of the N image regions; determining the focus region, by the prediction network, from the to-be-processed image by using an attention mechanism; obtaining, by the prediction network, for the target image region among the N image regions, the overlapping region between the target image region and the focus region; determining the attention, by the prediction network, for the target image region according to the area of the overlapping region; and adjusting the prediction probability of the defect by the prediction network in each image region according to the attention for each image region; and generating the prediction result, by the classifier, of the to-be-processed image according to the adjusted prediction probability of each image region.

In some embodiments, the attention includes a prediction weight. The adjustment unit 1004 may be configured to:

perform, by using a prediction weight of each image region, weighted processing on the prediction probability of the defect in the corresponding image region; and use the prediction probability of each image region after weighted processing as the adjusted prediction probability of the corresponding image region.

In some embodiments, the generation unit 1005 may be configured to:

sum the prediction probability of each image region after weighted processing, to obtain the prediction probability after weighted summation; and determine that the to-be-processed image is the defect image based on the prediction probability after weighted summation being greater than a probability threshold.

In some embodiments, the generation unit 1005 may be further configured to:

perform normalization processing on the prediction probability after weighted summation, to obtain a confidence of the prediction result.

In some embodiments, the confidence is used for indicating accuracy of the prediction result; and the apparatus further includes: an addition unit 1006.

The addition unit 1006 is configured to add a defect label for the to-be-processed image based on the confidence being greater than or equal to a first threshold; and add a normal label for the to-be-processed image based on the confidence not being greater than or equal to the first threshold.

In some embodiments, the confidence is used for reflecting a defect degree of the to-be-processed image; and the apparatus further includes: a restoration unit 1007.

The restoration unit 1007 is configured to perform restoration processing on the to-be-processed image based on the confidence being greater than or equal to a second threshold, to eliminate the defect in the to-be-processed image.

In some embodiments, the extraction unit 1001 may be configured to:

divide the to-be-processed image, and obtain one or more divided image regions; and perform feature extraction processing on the image regions by invoking a trained recognition model, to obtain one or more pieces of feature data corresponding to each image region.

In some embodiments, the extraction unit 1001 may be configured to:

perform plane interpolation processing on each divided image region, to adjust a size of each image region, where the adjusted size of each image region is same; and use an adjusted image region as a divided image region.

In some embodiments, after obtaining a to-be-processed image, an extraction unit 1001 may extract one or more pieces of feature data from each image region of the to-be-processed image respectively, and then a detection unit 1002 may perform defect detection on each image region of the to-be-processed image according to the extracted feature data, to obtain a prediction probability of a defect in each image region. In addition, an obtaining unit 1003 further obtains attention for each image region, and then an adjustment unit 1004 may adjust the prediction probability of the defect in each image region based on the attention for each image region, so that a generation unit 1005 generates a prediction result of the to-be-processed image and a confidence of the prediction result by using the adjusted prediction probability. Because the feature data is extracted based on different image regions, a local feature of the to-be-processed image can be fully considered, and prediction probabilities of defects in different image regions are adjusted based on the attention for each image region. In this way, the prediction result is obtained by performing adaptive integration according to different attention for different image regions, and the prediction result is more smooth, thereby improving accuracy of performing defect prediction on the to-be-processed image.

A person skilled in the art would understand that these "units" could be implemented by hardware logic, a processor or processors executing computer software code, or a combination of both.

Figure 11:
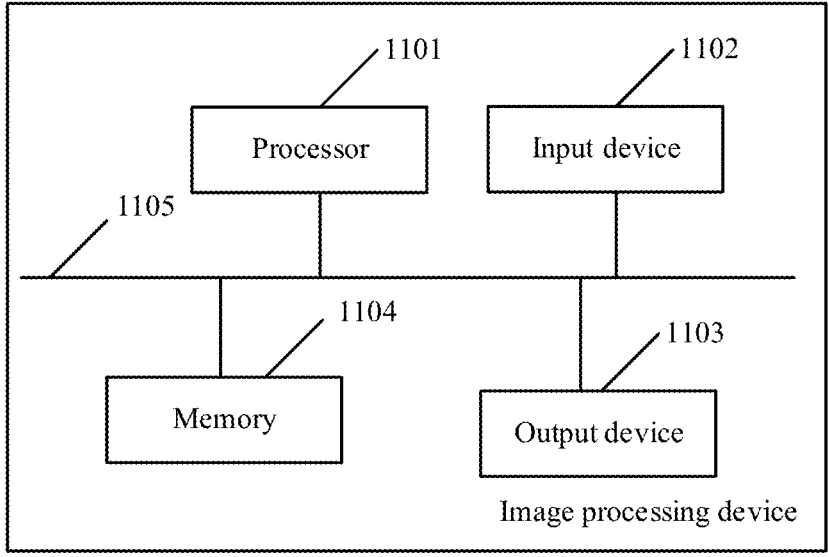
FIG. 11 is a schematic block diagram of an image processing device according to some embodiments.

FIG. 11 is a schematic structural block diagram of an image processing device according to some embodiments. The image processing device in some embodiments as shown in FIG. 11 may include: one or more processors 1101, one or more input devices 1102, one or more output devices 1103, and a memory 1104. The processor 1101, the input device 1102, the output device 1103, and the memory 1104 are connected through a bus 1105. The memory 1104 is configured to store a computer program, and the computer program includes program instructions. The processor 1101 is configured to execute the program instructions stored in the memory 1104.

The memory 1104 may include a volatile memory such as a random-access memory (RAM). The memory 1104 may alternatively include a non-volatile memory such as a flash memory or a solid-state drive (SSD). The memory 1104 may alternatively include a combination of the foregoing types of memories.

The processor 1101 may be a central processing unit (CPU). The processor 1101 may further include a hardware chip. The hardware chip may be an application-specific integrated circuit (ASIC), a programmable logic device (PLD), or the like. The PLD may be a field-programmable gate array (FPGA), generic array logic (GAL), or the like. The processor 1101 may alternatively be a combination of the foregoing structures.

In some embodiments, the memory 1104 is configured to store a computer program, and the computer program includes program instructions. The processor 1101 is configured to execute the program instructions stored in the memory 1104, to implement the operations of the corresponding methods in FIG. 2 and FIG. 5.

In some embodiments, the processor 1101 is configured to invoke the program instructions, and is configured to:

perform feature extraction processing on N image regions of a to-be-processed image respectively, to obtain feature data corresponding to the N image regions respectively, N being an integer greater than or equal to 1;

perform defect detection on the N image regions respectively according to the feature data corresponding to the N image regions respectively, to obtain a prediction probability of a defect in each of the N image regions;

obtain attention for each image region;

adjust the prediction probability of the defect in each image region according to the attention for each image region; and generate a prediction result of the to-be-processed image according to the adjusted prediction probability of each image region, the prediction result indicating whether the to-be-processed image is a defect image.

In some embodiments, the processor 1101 is configured to invoke the program instructions, and is configured to:

determine a focus region from the to-be-processed image;

obtain, for a target image region among the N image regions, an overlapping region between the target image region and the focus region; and determine attention for the target image region according to an area of the overlapping region, where the attention for the target image region is positively correlated with the area of the overlapping region.

In some embodiments, the image processing device performs the image processing method by using a recognition model, and the recognition model includes a feature extraction network, a prediction network, and a classifier.

The processor 1101 is configured to, using the feature extraction network, perform feature extraction processing on the N image regions of the to-be-processed image respectively, to obtain feature data corresponding to the N image regions respectively.

The processor 1101 is configured to, using the prediction network: perform defect detection on the N image regions respectively according to the feature data corresponding to the N image regions respectively, to obtain the prediction probability of the defect in each of the N image regions; determine the focus region from the to-be-processed image by using an attention mechanism; obtain, for the target image region among the N image regions, the overlapping region between the target image region and the focus region; determine the attention for the target image region according to the area of the overlapping region; and adjust the prediction probability of the defect in each image region according to the attention for each image region.

The processor 1101 is configured to, using the classifier, generate the prediction result of the to-be-processed image according to the adjusted prediction probability of each image region.

In some embodiments, the attention includes a prediction weight of the prediction probability. The processor 1101 is configured to invoke the program instructions, and is configured to:

perform, by using a prediction weight of each image region, weighted processing on the prediction probability of the defect in the corresponding image region; and use the prediction probability of each image region after weighted processing as the adjusted prediction probability of the corresponding image region.

In some embodiments, the processor 1101 is configured to invoke the program instructions, and is configured to:

sum the prediction probability of each image region after weighted processing, to obtain the prediction probability after weighted summation; and determine that the to-be-processed image is the defect image based on the prediction probability after weighted summation being greater than a probability threshold.

In some embodiments, the processor 1101 is configured to invoke the program instructions, and is configured to:

perform normalization processing on the prediction probability after weighted summation, to obtain a confidence of the prediction result.

In some embodiments, the confidence is used for indicating accuracy of the prediction result. The processor 1101 is configured to invoke the program instructions, and is configured to:

add a defect label for the to-be-processed image based on the confidence being greater than or equal to a first threshold; and add a normal label for the to-be-processed image based on the confidence not being greater than or equal to the first threshold.

In some embodiments, the confidence is used for reflecting a defect degree of the to-be-processed image. The processor 1101 is configured to invoke the program instructions, and is configured to:

perform restoration processing on the to-be-processed image based on the confidence being greater than or equal to a second threshold, to eliminate the defect in the to-be-processed image.

In some embodiments, the processor 1101 is configured to invoke the program instructions, and is configured to:

divide the to-be-processed image, and obtain one or more divided image regions; and perform feature extraction processing on the image regions by invoking a trained recognition model, to obtain one or more pieces of feature data corresponding to each image region.

In some embodiments, the processor 1101 is configured to invoke the program instructions, and is configured to:

perform plane interpolation processing on each divided image region, to adjust a size of each image region, where the adjusted size of each image region is same; and use an adjusted image region as a divided image region.

Some embodiments may provide a computer program product or a computer program, the computer program product or the computer program including computer instructions, the computer instructions being stored in a computer-readable storage medium. A processor of a computer device reads the computer instructions from the computer-readable storage medium, and executes the computer instructions, to cause the computer device to perform the method embodiment as shown in FIG. 2 or FIG. 5. The computer readable storage medium may be a magnetic disk, an optical disc, a read-only memory (Read-Only Memory, ROM), a random access memory (Random Access Memory, RAM), or the like.

The foregoing embodiments are used for describing, instead of limiting the technical solutions of the disclosure.

A person of ordinary skill in the art shall understand that although the disclosure has been described in detail with reference to the foregoing embodiments, modifications can be made to the technical solutions described in the foregoing embodiments, or equivalent replacements can be made to some technical features in the technical solutions, provided that such modifications or replacements do not cause the essence of corresponding technical solutions to depart from the spirit and scope of the technical solutions of the embodiments of the disclosure.

What is claimed is:

1. An image processing method, performed by an electronic device, the image processing method comprising:

performing feature extraction processing on N image regions of a to-be-processed image to obtain feature data corresponding to the N image regions, N being an integer greater than or equal to 1, the performing the feature extraction further comprising:

dividing the to-be-processed image, and obtaining one or more divided image regions by performing plane interpolation processing on each divided image region to adjust a size of each of the divided image regions, the adjusted size of each of the divided image regions being the same, and using an adjusted image region as the divided image region;

performing defect detection on the N image regions according to the feature data to obtain a prediction probability of a defect in each of the N image regions;

obtaining attention for each of the N image regions based on a location of a respective image region;

adjusting the prediction probability of the defect in each of the N image regions according to the attention for each of the N image regions; and generating a prediction result of the to-be-processed image according to the adjusted prediction probability of each of the N image regions, the prediction result indicating whether the to-be-processed image is a defect image.

2. The image processing method according to claim 1, wherein the obtaining attention comprises:

determining a focus region from the to-be-processed image;

obtaining, for a target image region among the N image regions, an overlapping region between the target image region and the focus region; and determining the attention for the target image region according to an area of the overlapping region, wherein the attention for the target image region is positively correlated with the area of the overlapping region.

3. The image processing method according to claim 2, wherein the method further comprises:

calling a recognition model comprising a feature extraction network, a prediction network, and a classifier;

performing the feature extraction processing, by the extraction network, on each of the N image regions of the to-be-processed image to obtain the feature data corresponding to each of the N image regions;

performing the defect detection, by the prediction network, on each of the N image regions according to the feature data corresponding to each of the N image regions to obtain the prediction probability of the defect in each of the N image regions;

determining the focus region, by the prediction network, from the to-be-processed image by using an attention mechanism;

obtaining, by the prediction network, for the target image region among the N image regions, the overlapping region between the target image region and the focus region;

determining the attention, by the prediction network, for the target image region according to the area of the overlapping region; and adjusting the prediction probability of the defect by the prediction network in each of the N image regions according to the attention for each of the N image regions; and generating the prediction result, by the classifier, of the to-be-processed image according to the adjusted prediction probability of each of the N image regions.

4. The image processing method according to claim 1, wherein the attention comprises a prediction weight of the prediction probability; and the adjusting comprises:

performing, based on the prediction weight of each of the N image regions, weighted processing on the prediction probability of the defect in each of the image regions; and using the prediction probability of each of the N image regions after weighted processing as the adjusted prediction probability of each of the N image regions.

5. The image processing method according to claim 4, wherein the generating comprises:

summing the prediction probability of each of the N image regions after weighted processing to obtain the prediction probability after weighted summation; and based on the prediction probability after weighted summation being greater than a probability threshold, determining that the to-be-processed image is the defect image.

6. The image processing method according to claim 5, wherein after the summing the prediction probability, the image processing method further comprises:

performing normalization processing on the prediction probability after weighted summation to obtain a confidence of the prediction result.

7. The image processing method according to claim 6, wherein the confidence indicates accuracy of the prediction result; and the image processing method further comprises:

adding a defect label for the to-be-processed image based on the confidence being greater than or equal to a first threshold; and adding a normal label for the to-be-processed image based on the confidence not being greater than or equal to the first threshold.

8. The image processing method according to claim 6, wherein the confidence reflects a defect degree of the to-be-processed image; and the image processing method further comprises:

based on the confidence being greater than or equal to a second threshold, performing restoration processing on the to-be-processed image to eliminate the defect in the to-be-processed image.

9. The image processing method according to claim 1, wherein the performing feature extraction processing comprises:

performing the feature extraction processing on each of the divided image region by invoking a trained recognition model to obtain one or more pieces of feature data corresponding to each of the divided image region.

10. An image processing apparatus, comprising:

at least one memory configured to store program code; and at least one processor configured to read the program code and operate as instructed by the program code, the program code comprising:

extraction code configured to cause the at least one processor to perform feature extraction processing on N image regions of a to-be-processed image to obtain feature data corresponding to each of the N image regions, N being an integer greater than or equal to 1, the extraction code further including dividing code configured to cause the at least one processor to divide the to-be-processed image, and obtaining code configured to cause the at least one processor to obtain one or more divided image regions by performing plane interpolation processing on each divided image region to adjust a size of each of the divided image regions, the adjusted size of each of the divided image regions being the same, and using an adjusted image region as the divided image region;

detection code configured to cause the at least one processor to perform defect detection on each of the N image regions according to the feature data to obtain a prediction probability of a defect in each of the N image regions;

obtaining code configured to cause the at least one processor to obtain attention for each of the N image regions based on a location of a respective image region;

adjustment code configured to cause the at least one processor to adjust the prediction probability of the defect in each of the N image regions according to the attention for each of the N image regions; and generation code configured to cause the at least one processor to generate a prediction result of the to-be-processed image according to the adjusted prediction probability of each of the N image regions, the prediction result indicating whether the to-be-processed image is a defect image.

11. The image processing apparatus according to claim 10, wherein the obtaining code is further configured to cause the at least one processor to:

determine a focus region from the to-be-processed image;

obtain, for a target image region among the N image regions, an overlapping region between the target image region and the focus region; and determine the attention for the target image region according to an area of the overlapping region, wherein the attention for the target image region is positively correlated with the area of the overlapping region.

12. The image processing apparatus according to claim 11, wherein the program code is further configured to cause the at least one processor to:

call a recognition model comprising a feature extraction network, a prediction network, and a classifier;

perform the feature extraction processing, using the feature extraction network, on each of the N image regions of the to-be-processed image to obtain the feature data corresponding to each of the N image regions;

perform the defect detection, using the prediction network, on each of the N image regions according to the feature data corresponding to each of the N image regions to obtain the prediction probability of the defect in each of the N image regions;

determine, using the prediction network, the focus region from the to-be-processed image by using an attention mechanism;

obtain, using the prediction network, for the target image region among the N image regions, the overlapping region between the target image region and the focus region;

determine, using the prediction network, the attention for the target image region according to the area of the overlapping region; and adjust, using the prediction network, the prediction probability of the defect in each of the N image regions according to the attention for each of the N image regions; and generate the prediction result, using the classifier, of the to-be-processed image according to the adjusted prediction probability of each image region.

13. The image processing apparatus according to claim 10, wherein the attention comprises a prediction weight of the prediction probability, and the adjustment code is further configured to cause the at least one processor to:

perform, based on the prediction weight of each of the N image regions, weighted processing on the prediction probability of the defect in each of the N image regions; and use the prediction probability of each of the N image regions after weighted processing as the adjusted prediction probability of each of the N image regions.

14. The image processing apparatus according to claim 13, wherein the generation code is further configured to cause the at least one processor to:

sum the prediction probability of each of the N image regions after weighted processing to obtain the prediction probability after weighted summation; and based on the prediction probability after weighted summation being greater than a probability threshold, determine that the to-be-processed image is the defect image.

15. The image processing apparatus according to claim 14, wherein the generation code is further configured to cause the at least one processor to perform normalization processing on the prediction probability after weighted summation to obtain a confidence of the prediction result.

16. The image processing apparatus according to claim 15, wherein the confidence indicates an accuracy of the prediction result; and the program code further comprises:

addition code configured to cause the at least one processor to add a defect label for the to-be-processed based on the confidence being greater than or equal to a first threshold; and add a normal label for the to-be-processed image based on the confidence not being greater than or equal to the first threshold.

17. The image processing apparatus according to claim 15, wherein the confidence reflects a defect degree of the to-be-processed image; and the program code further comprises:

restoration code configured to cause the at least one processor to perform restoration processing on the to-be-processed image based on the confidence being greater than or equal to a second threshold to eliminate the defect in the to-be-processed image.

18. A non-transitory computer-readable storage medium, storing a computer code that when executed by at least one processor causes the at least one processor to:

perform feature extraction processing on N image regions of a to-be-processed image to obtain feature data corresponding to each of the N image regions, N being an integer greater than or equal to 1, the performance the feature extraction further comprising:

divide the to-be-processed image, and obtain one or more divided image regions by performing plane interpolation processing on each divided image region to adjust a size of each of the divided image regions, the adjusted size of each of the divided image regions being the same, and using an adjusted image region as the divided image region;

perform defect detection on each of the N image regions according to the feature data to obtain a prediction probability of a defect in each of the N image regions;

obtain attention for each of the N image regions based on a location of a respective image region;

adjust the prediction probability of the defect in each of the N image regions according to the attention for each of the N image regions; and generate a prediction result of the to-be-processed image according to the adjusted prediction probability of each of the N image regions, the prediction result indicating whether the to-be-processed image is a defect image.

19. The non-transitory computer-readable storage medium according to claim 18, wherein the obtain attention for each of the N image regions comprises:

determining a focus region from the to-be-processed image;

obtaining, for a target image region among the N image regions, an overlapping region between the target image region and the focus region; and determining the attention for the target image region according to an area of the overlapping region, wherein the attention for the target image region is positively correlated with the area of the overlapping region.

* * * * *